(12) United States Patent  (10) Patent No.: US 6,604,877 B2
Cheng  (45) Date of Patent: Aug. 12, 2003

(54) KEY TOP LAYOUT OF A KEYBOARD

(76) Inventor: Kuo Shu Cheng, 6F, No. 108, Min-Chun Road, Hsin-Tien, Taipei (TW)

( * ) Notice: Subject to any disclaimer, the term of this patent is extended or adjusted under 35 U.S.C. 154(b) by 0 days.

(21) Appl. No.: 09/962,233

(22) Filed: Sep. 26, 2001

(65) Prior Publication Data

US 2003/0049066 A1 Mar. 13, 2003

(30) Foreign Application Priority Data

Sep. 12, 2001 (TW) .................................. 90215716 U (51) Int. Cl.⁷ .................................................. B41J 5/10
(52) U.S. Cl. ....................... 400/472; 400/489; D14/392
(58) Field of Search .................. 400/472, 489, 400/488, 486; D14/392, 393; 345/168; 341/22; 361/680; 235/145 R; B41J 5/10

(56) References Cited

U.S. PATENT DOCUMENTS 1,468,566 A * 9/1923 Hall ........................ 235/145 R
D357,011 S * 4/1995 Paull et al. ................ D14/393

FOREIGN PATENT DOCUMENTS

GB 2311256 A * 9/1997 .............. B41J/5/10

* cited by examiner

Primary Examiner—Leslie J. Evanisko
Assistant Examiner—Leo T. Hinze
(74) Attorney, Agent, or Firm—Joe Nieh (57) ABSTRACT

A keytop of keyboard is proposed. The keyboard has a main typing area on which a plurality of key tops is placed. The key tops are divided into a plurality of rows by a plurality of horizontal lines. The key tops are divided into a left-hand section and a right-hand section with a centerline of the keyboard as a border. Each key top in the left-hand section is of quadrilateral shape with right-shifted topside and left-shifted bottom side; each key top in the right-hand section is of quadrilateral shape with left-shifted topside and right-shifted bottom side.

7 Claims, 8 Drawing Sheets

FIG. 1
PRIOR ART

FIG.2 PROIR ART

FIG.3 PROIR ART

KEY TOP LAYOUT OF A KEYBOARD

FIELD OF THE INVENTION

The present invention relates to a key top layout of keyboard, especially to a key top with ergonomic design and not wasting space.

BACKGROUND OF THE INVENTION

Figure 1:
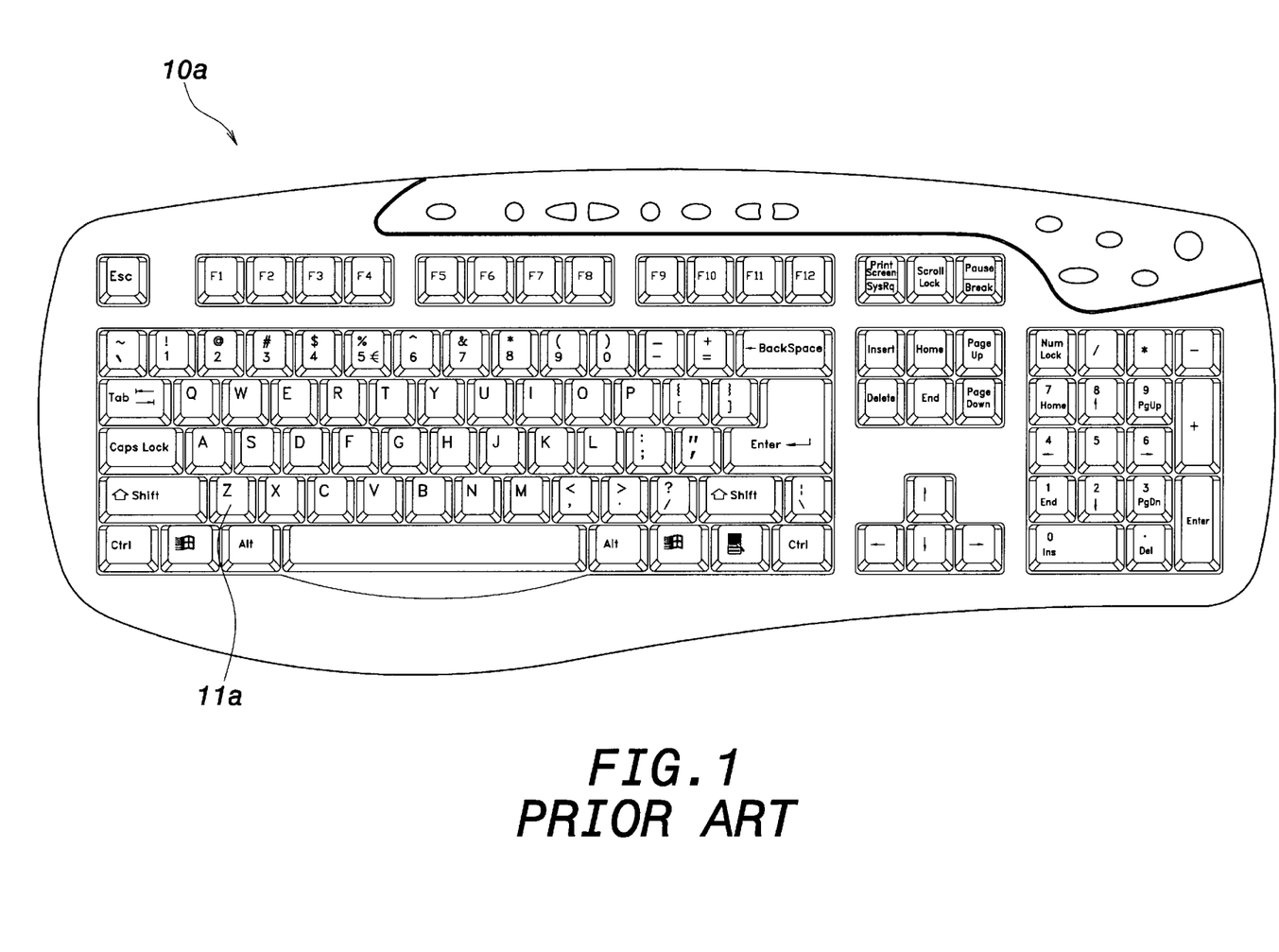
FIG. 1 shows a planar view of a conventional keyboard.
Figure 2:
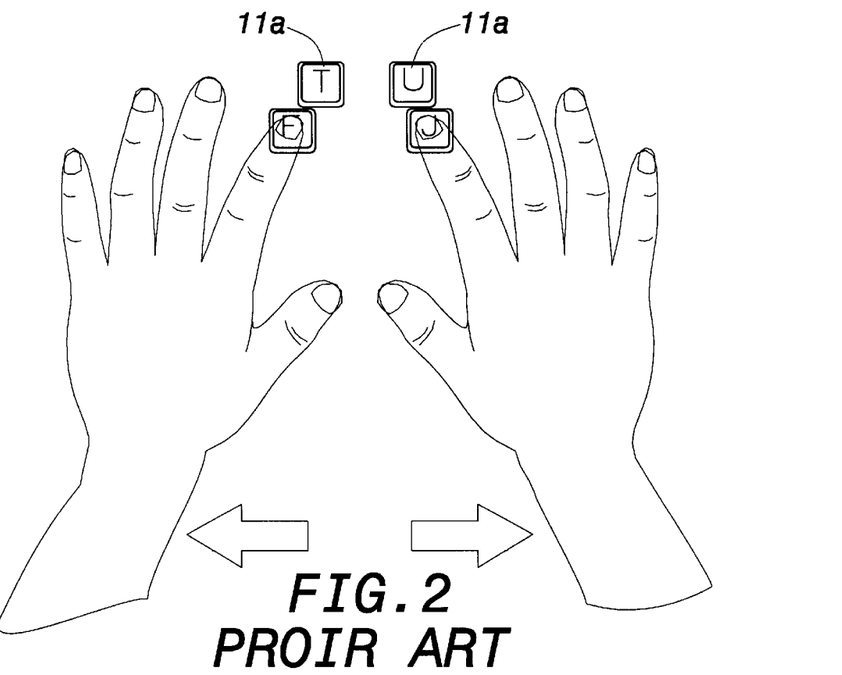
FIG. 2 is a view for demonstrating the operation of the conventional keyboard.
Figure 3:
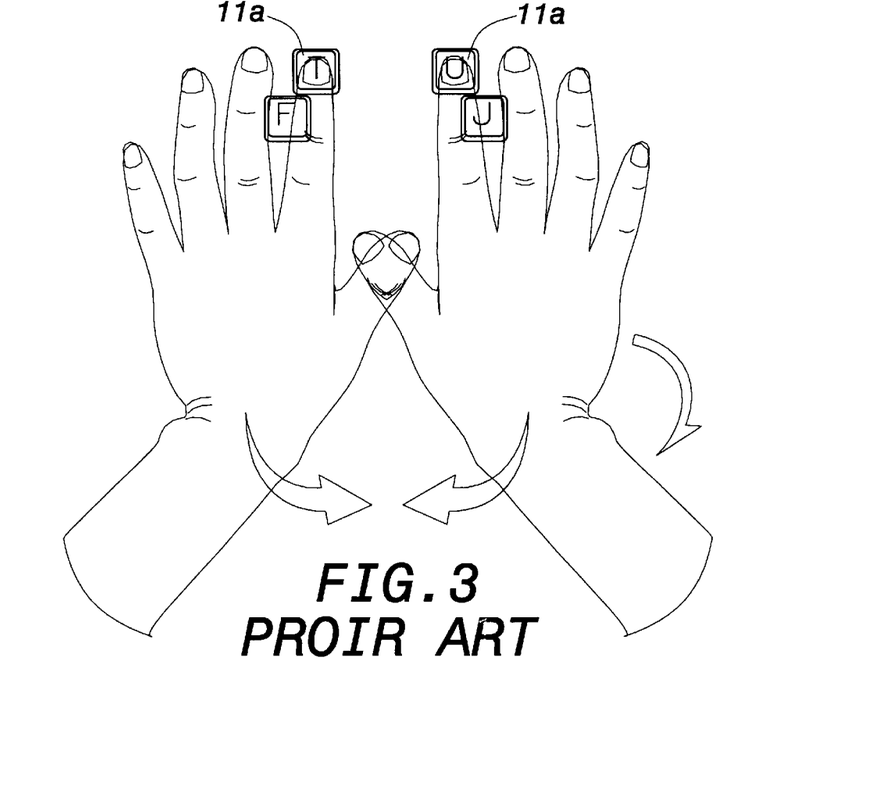
FIG. 3 is another view for demonstrating the operation of the conventional keyboard.

The computers are extensively used in modern society for data processing or other task such as spreadsheet. Therefore, the input devices for computer are also important to facilitate those jobs. For example, a keyboard is an inevitable input device for computer. FIGS. 1 to 3 show a conventional keyboard 10a. As shown in those figures, the keyboard 10a has a plurality of keyswitches and each keyswitch has a key top 11a thereon. The key tops 11a are arranged in chessboard pattern and each has a rectangular shape. However, the hands of user naturally align in inclined directions with respect to the vertical bisection line of the keyboard 10a. The user often needs to wrench inward his hands to types keys near the vertical bisection line of the keyboard 10a as shown in FIG. 3. Therefore, the user tends to have ache symptom after long time of typing.

Figure 4:
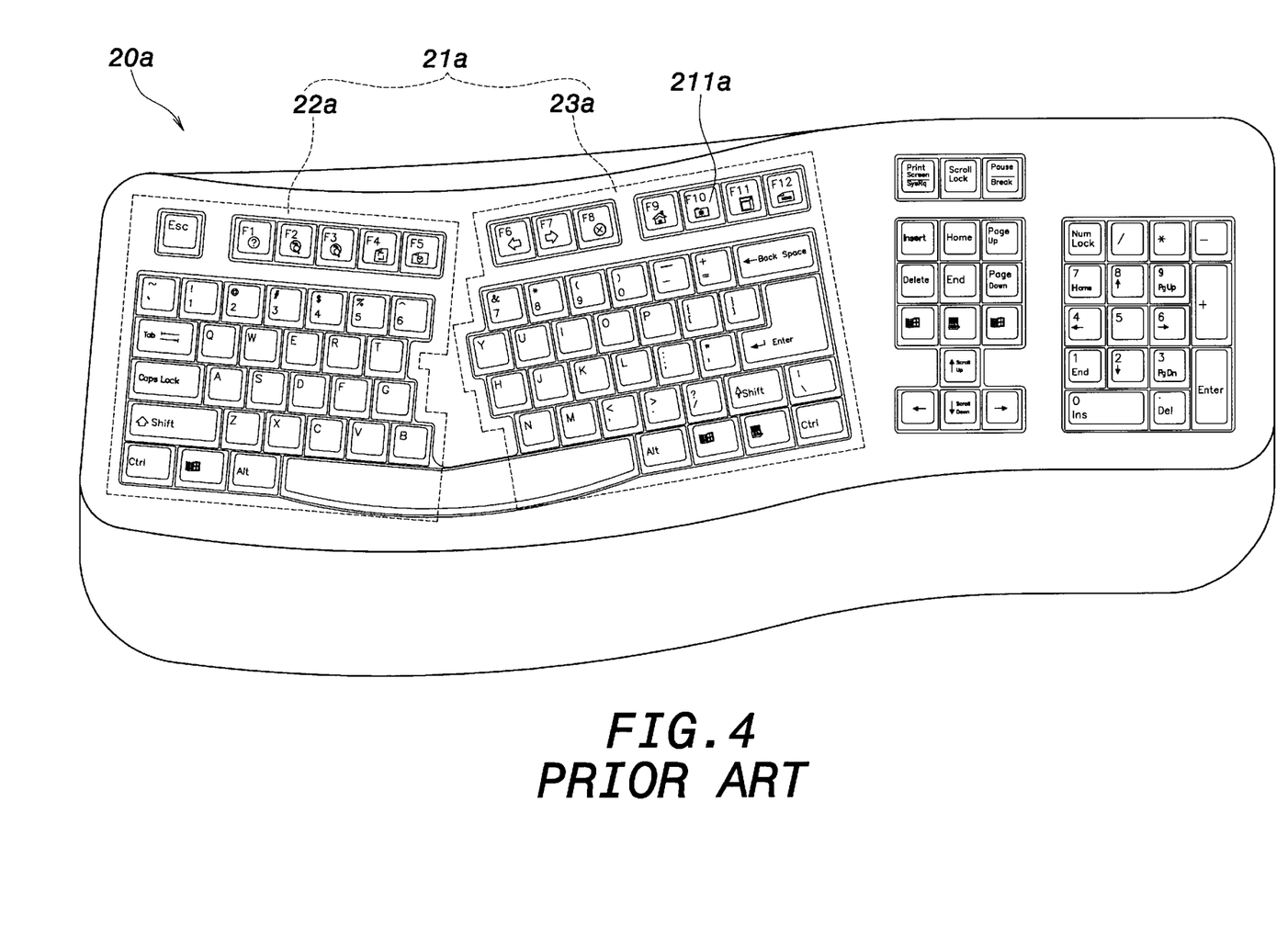
FIG. 4 shows a planar view of an ergonomic keyboard.

As shown in FIG. 4, an ergonomic keyboard 20a is developed to solve this problem. The ergonomic keyboard 20a generally has a main typing area 21a and the key tops 211a in the main typing area 21a are also of rectangular shape. Moreover, the main typing area 21a is divided into a left-hand section 22a and a right-hand section 23a such that the user can put his hands on the keyboard 20a in a more ergonomic way. However, a wasted space is inevitably placed at center portion of the ergonomic keyboard 20a. The area of the ergonomic keyboard 20a is increased such that the ergonomic keyboard 20a is not suitable for notebook computer.

SUMMARY OF THE INVENTION

It is the object of the present invention to provide a key top layout with ergonomic design and not wasting space. The keyboard using this key top layout is suitable for desktop computer, notebook computer and cash register.

To achieve above object, the present invention provides a key top layout of keyboard. The keyboard has a main typing area on which a plurality of key tops is placed. The key tops are divided into a plurality of rows by a plurality of horizontal lines. The key tops are divided into a left-hand section and a right-hand section with a centerline of the keyboard as a border. Each key top in the left-hand section is of quadrilateral shape with right-shifted topside and left-shifted bottom side; each key top in the right-hand section is of quadrilateral shape with left-shifted topside and right-shifted bottom side.

The various objects and advantages of the present invention will be more readily understood from the following detailed description when read in conjunction with the appended drawing, in which:

DETAILED DESCRIPTION OF THE INVENTION

Figure 5:
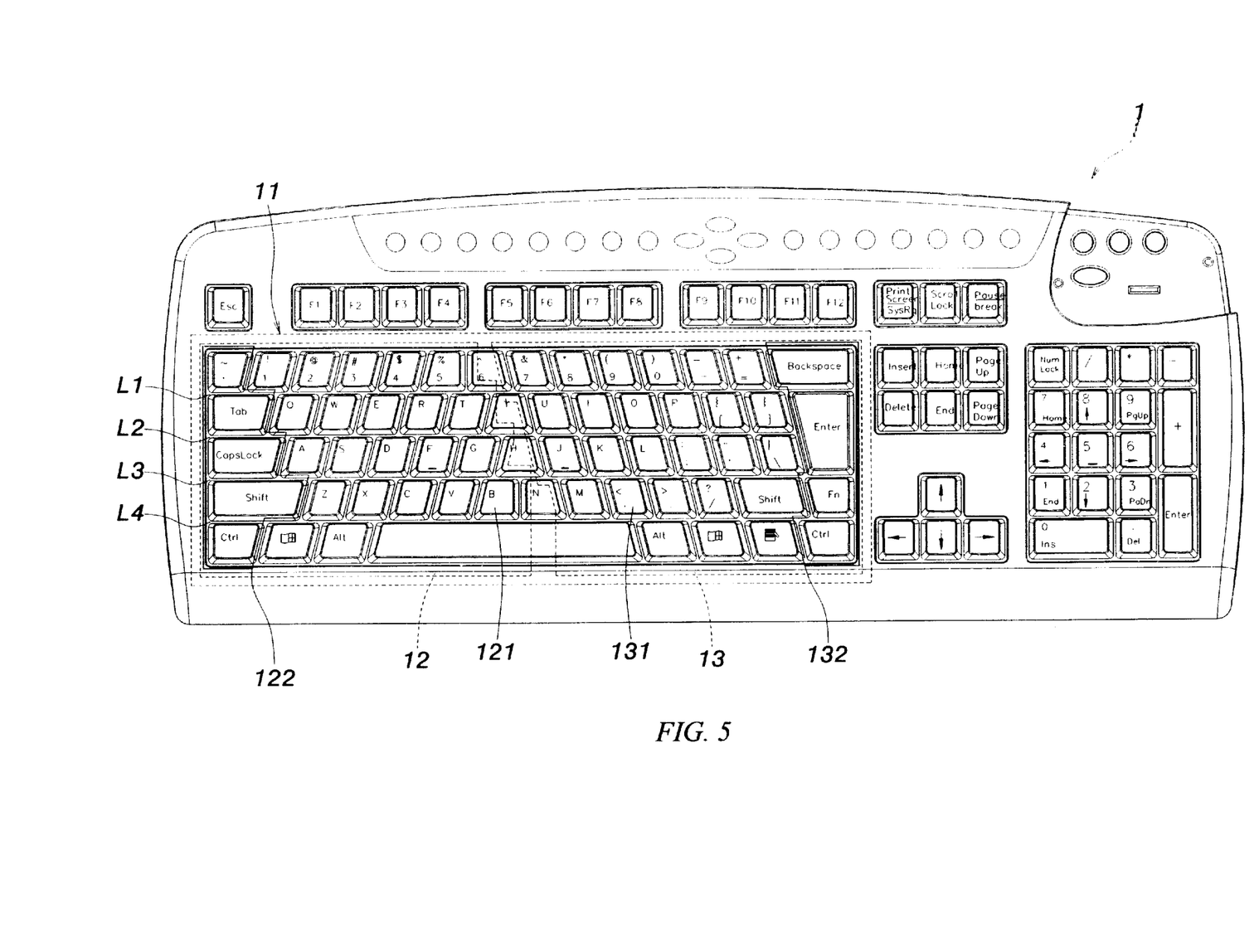
FIG. 5 shows a planar view of the keyboard according to a preferred embodiment of the present invention.

As shown in FIG. 5, the present invention is intended to provide a key top layout for keyboard with ergonomic design and not wasting space. The keyboard 1 according to a preferred embodiment of the present invention also has a main typing area 11 on which a plurality of sign keys, a plurality of alphabet keys, a plurality of auxiliary function keys and a space key are placed. The main typing area 11 is divided into a plurality of rows by a plurality of horizontal lines. In this preferred embodiment of the present invention, the main typing area 11 is divided into five rows by four horizontal lines L1, L2, L3 and L4. The keys in the main typing area 11 are arranged in a way similar to that of conventional keyboard and are separated by a Y key and an H key into two sections, i.e., a left-hand section 12 and a right-hand section 13. Each key top 121 in the left-hand section 12 is of parallelogram shape with right-shifted topside and left-shifted bottom side; while the topside and bottom side of key top 121 is parallel to the horizontal lines L1, L2, L3 and L4. Moreover, each key top 131 in the right-hand section 13 is of parallelogram shape with left-shifted topside and right-shifted bottom side; while the topside and bottom side of key top 131 is parallel to the horizontal lines L1, L2, L3 and L4. Moreover, the main typing area 11 has a leftmost key top 122 on left side thereof and a rightmost key top 132 on a right side thereof. The leftmost key top 122 has a vertical left side and the rightmost key top 132 has a vertical right side. The Y key and the H key on the main typing area 11 are made of trapezoid shape. Therefore, the keyboard with the inventive key top layout will have ergonomic and have not much area.

Figure 6:
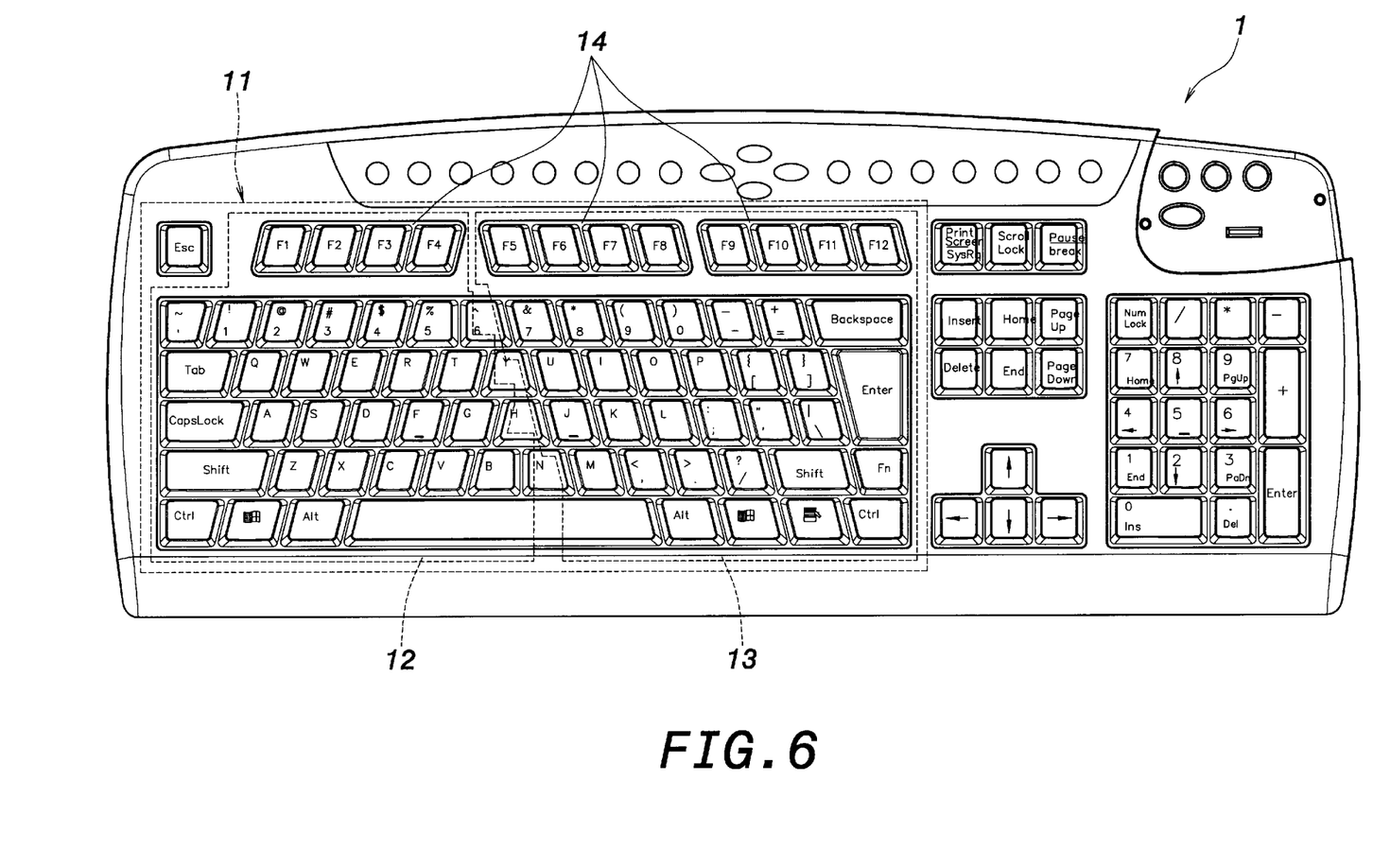
FIG. 6 shows a planar view of the keyboard according to another preferred embodiment of the present invention.

FIG. 6 shows another preferred embodiment of the present invention. In this preferred embodiment of the present invention, the main typing area 11 further includes a row of function keys 14. The function keys 14 are also arranged in a way similar to that of conventional keyboard. The function keys 14 are also divided into the left-hand section 12 and the right-hand section 13 of the main typing area 11. More particularly, the function keys F1 to F4 are placed in the left-hand section 12 and the function keys F5 to F12 are placed in the right-hand section 13. Each key top 121 of the function keys in the left-hand section 12 is of parallelogram shape with right-shifted topside and left-shifted bottom side. Moreover, each key top 131 of the function keys in the right-hand section 13 is of parallelogram shape with left-shifted topside and right-shifted bottom side. The function key F12 has a vertical right side.

Figure 7:
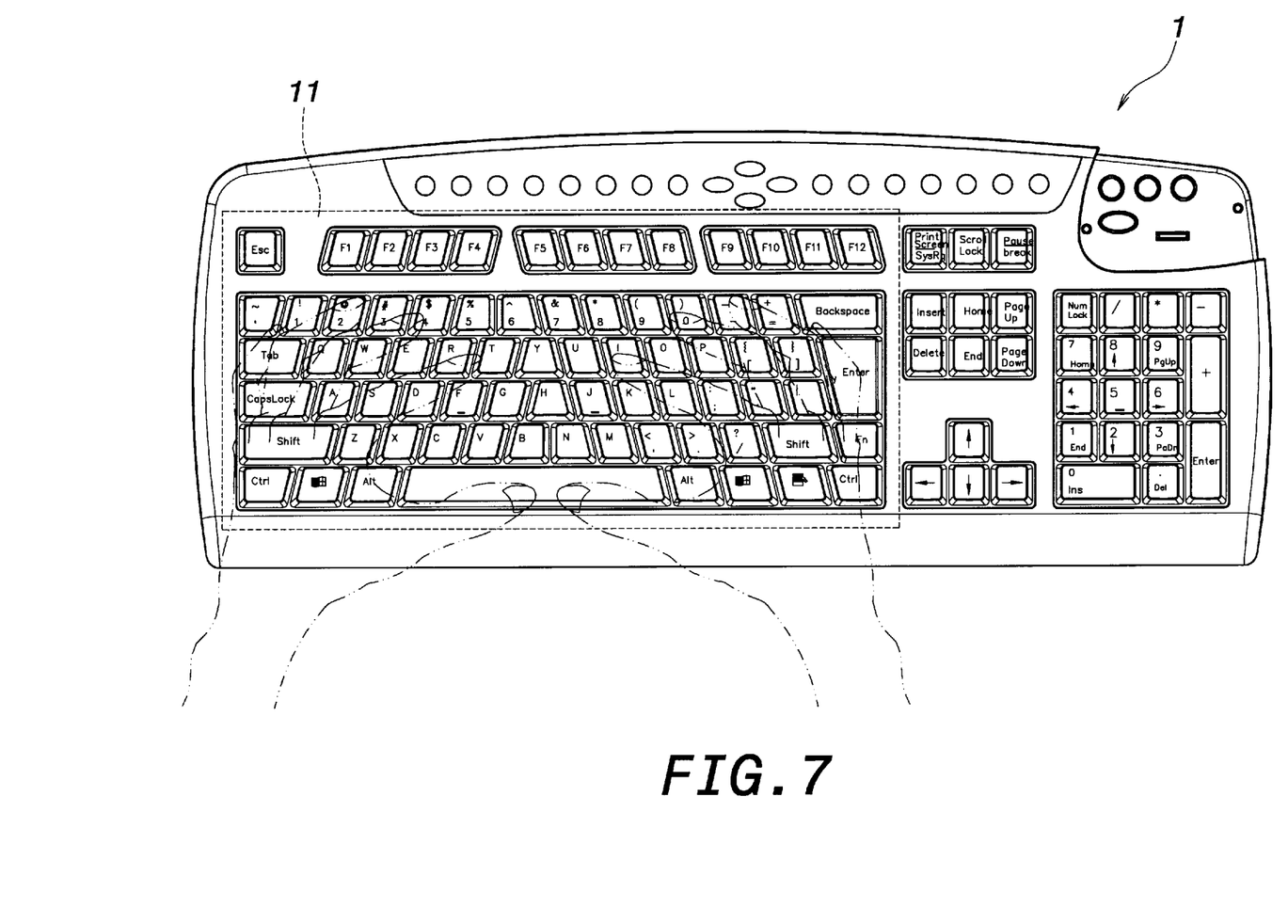
FIG. 7 is a view for demonstrating the operation of the keyboard of the present invention.
Figure 8:
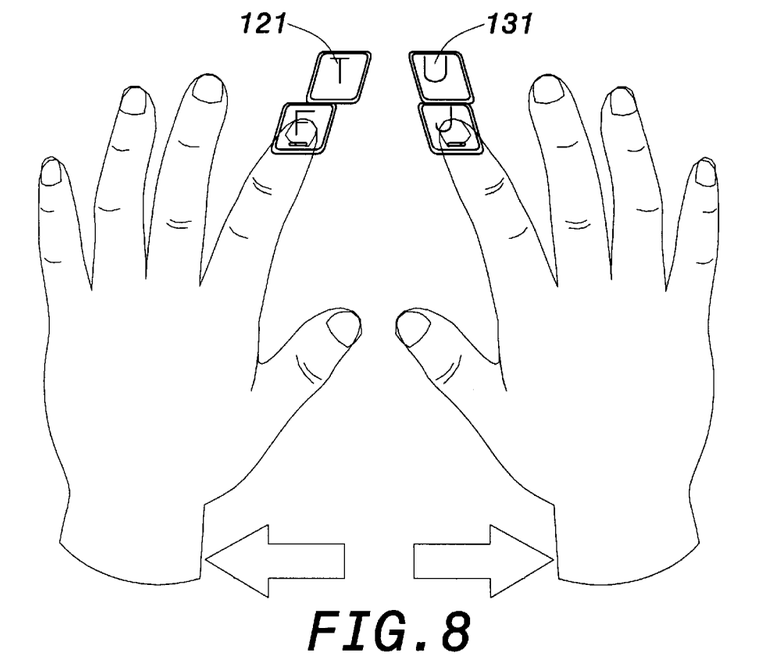
FIG. 8 is another view for demonstrating the operation of the keyboard of the present invention.
Figure 9:
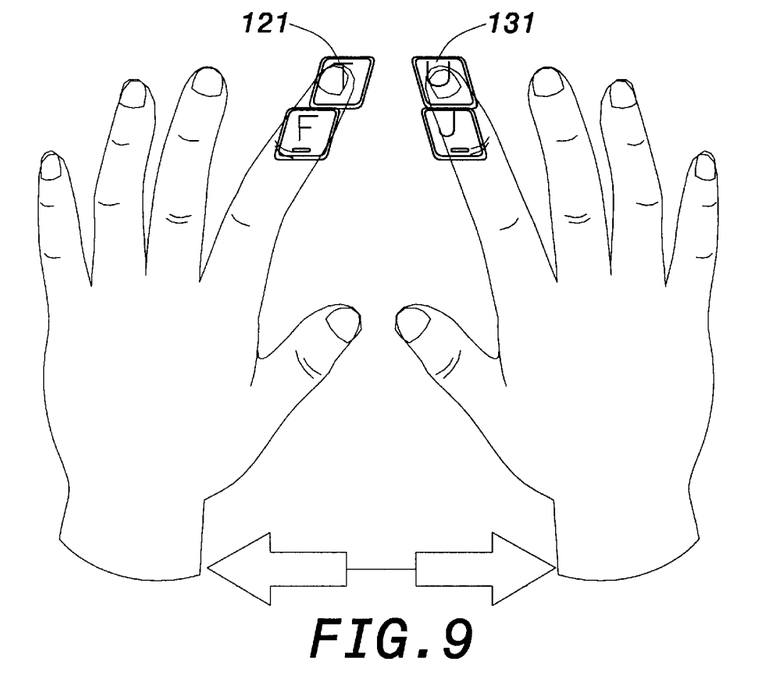
FIG. 9 is still another view for demonstrating the operation of the keyboard of the present invention.

As shown in FIG. 7, the user can place his hands in a natural and ergonomic way on the keyboard 1 with inventive key top. The Y key and the H key on the main typing area 11 have enlarged area to facilitate typing operation. Therefore, the ache symptom of user due to long-time typing can be prevented. Moreover, as shown in FIGS. 8 and 9, each key top 121 of the function keys in the left-hand section 12 and each key top 131 of the function keys in the right-hand section 13 are of parallelogram shape with ergonomic skew direction. The separation between two adjacent keys can be reduced to reduce movement distance of hand. Therefore, the ache symptom of user due to long-time typing can be prevented.

Figure 10:
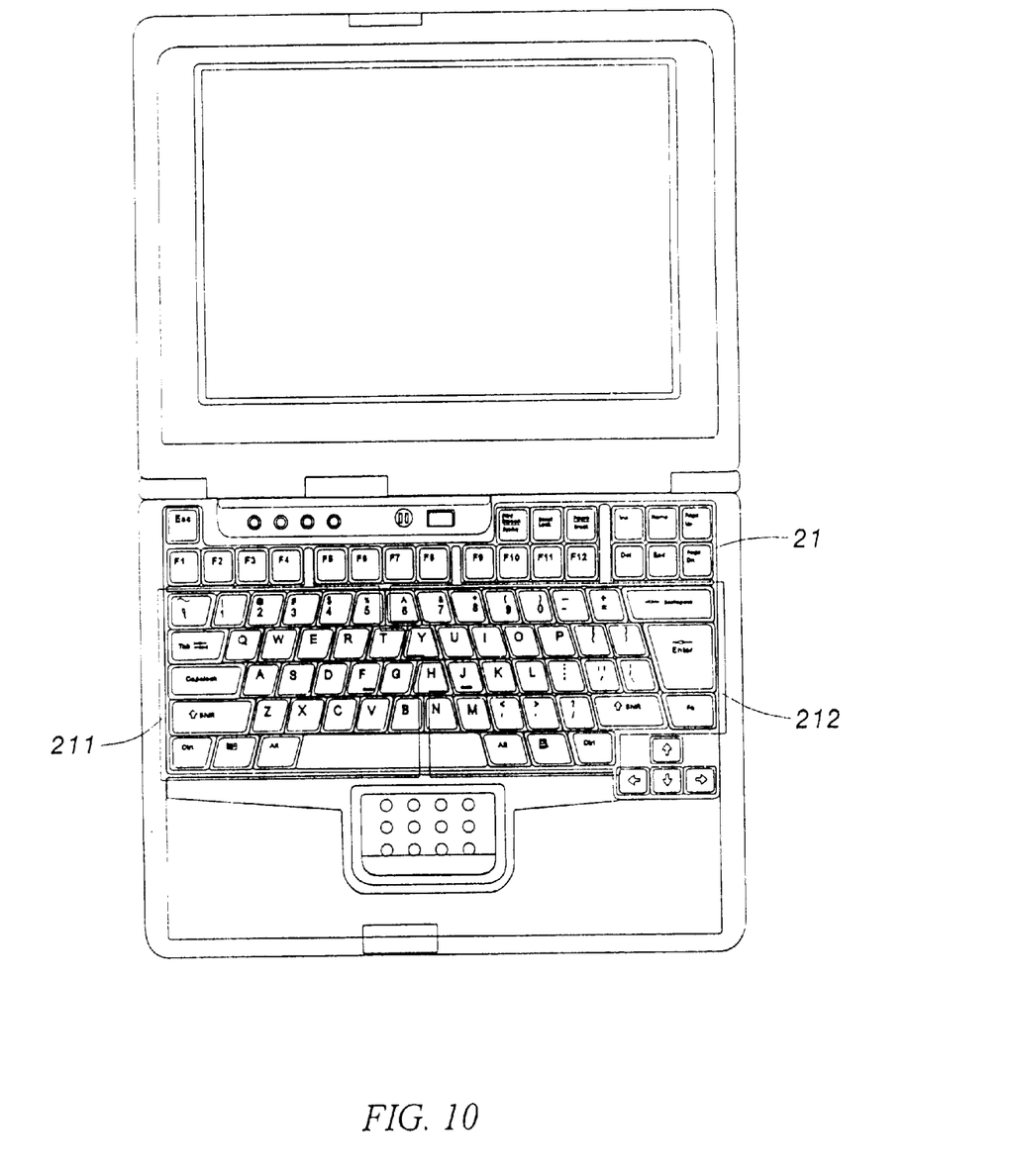
FIG. 10 shows a planar view of the keyboard according to still another preferred embodiment of the present invention.

FIG. 10 shows still another preferred embodiment of the present invention. The inventive key tops are arranged on the keyboard 21 of a notebook computer 21. Similarly, the keyboard 21 of a notebook computer 21 is divided into a left-hand section 211 and a right-hand section 212. Each key top in the left-hand section 211 is of parallelogram shape with right-shifted topside and left-shifted bottom side; each key top in the right-hand section 212 is of parallelogram shape with left-shifted topside and right-shifted bottom side. The keyboard 21 of a notebook computer 21 still has ergonomic feature while the area of the key top is not increased.

To sum up, the inventive key top layout for keyboard has modified shape to provide ergonomic feature while the area of the keyboard is not increased. The keyboard using the inventive key top layout is not bulky and can be applied to desktop computer, notebook computer and cash register.

Although the present invention has been described with reference to the preferred embodiment thereof, it will be understood that the invention is not limited to the details thereof. Various substitutions and modifications have suggested in the foregoing description, and other will occur to those of ordinary skill in the art. Therefore, all such substitutions and modifications are intended to be embraced within the scope of the invention as defined in the appended claims.

I claim:

1. A key top layout of a keyboard, the keyboard having a main typing area on which a plurality of the key tops are placed, the key tops being divided into a plurality of rows by a plurality of horizontal lines and including a left-hand section and a right-hand section, each section having left-most and right-most key tops; each key top in the left-hand section being of quadrilateral shape with a right-shifted topside and a left-shifted bottom side, except the left-most key tops which have vertical left sides, and the right-most key tops, which have vertical right sides; each key top in the right-hand section being of quadrilateral shape with a left-shifted topside and a right-shifted bottom side, except the right-most key tops which have vertical right sides, and the left-most key tops, which have vertical left sides.

2. The key top layout of a keyboard as in claim 1, wherein a plurality of sign keys, a plurality of alphabet keys, a plurality of auxiliary function keys and a space key are placed in the main typing area.

3. The key top layout of a keyboard as in claim 1, wherein the main typing area further comprises a row of function keys and the function keys are divided into a left-hand section and a right-hand section.

4. The key top layout of a keyboard as in claim 1, wherein the key tops in the main typing area are arranged in the layout of a QWERTY keyboard.

5. The key top layout of a keyboard as in claim 1, wherein the left-hand section and the right-hand section are separated by a Y key and a H key.

6. The key top layout of a keyboard as in claim 1, wherein each key top in the left-hand section not having a vertical left or right side is of parallelogram shape with a right-shifted topside and a left-shifted bottom side.

7. The key top layout of a keyboard as in claim 1, wherein each key top in the right-hand section not having a vertical left or right side is of parallelogram shape with a left-shifted topside and a right-shifted bottom side.

* * * * *